(12) United States Patent
Perry et al.

(10) Patent No.: US 9,404,033 B2
(45) Date of Patent: Aug. 2, 2016

(54) ENVIRONMENTALLY BENEFICIAL RECYCLING OF BRINES IN THE PROCESS OF REDUCING FRICTION RESULTING FROM TURBULENT FLOW

(71) Applicant: Ecolab USA Inc., Eagan, MN (US)

(72) Inventors: Houston P. Perry, Pearland, TX (US); Brian L. Mueller, Missouri City, TX (US)

(73) Assignee: Ecolab USA Inc., Eagan, MN (US)

( * ) Notice: Subject to any disclaimer, the term of this patent is extended or adjusted under 35 U.S.C. 154(b) by 278 days.

(21) Appl. No.: 13/968,483

(22) Filed: Aug. 16, 2013

(65) Prior Publication Data

US 2014/0051610 A1    Feb. 20, 2014

Related U.S. Application Data

(60) Provisional application No. 61/684,520, filed on Aug. 17, 2012.

(51) Int. Cl.
*C09K 8/68* (2006.01)
*E21B 43/26* (2006.01)
*E21B 43/16* (2006.01)
*E21B 21/00* (2006.01)
*C09K 8/12* (2006.01)
*C09K 8/66* (2006.01)
(Continued)

(52) U.S. Cl.
CPC ... *C09K 8/68* (2013.01); *C09K 8/12* (2013.01); *C09K 8/665* (2013.01); *C09K 8/845* (2013.01); *C09K 8/882* (2013.01); *E21B 21/00* (2013.01); *E21B 43/16* (2013.01); *E21B 43/26* (2013.01); *C09K 2208/28* (2013.01); *Y10T 137/2514* (2015.04)

(58) Field of Classification Search
None
See application file for complete search history.

(56) References Cited

U.S. PATENT DOCUMENTS 3,624,019 A    11/1971    Anderson et al.
4,016,894 A    4/1977    Baldwin et al.
(Continued)

FOREIGN PATENT DOCUMENTS

WO    WO2010027366 A1    3/2010
WO    2012/061147 A1    5/2012

OTHER PUBLICATIONS

PCT/US2013/055274 "PCT International Search Report and Written Opinion", Date of mailing: Oct. 21, 2013, 11 pages.
(Continued)

*Primary Examiner* — John J Figueroa
(74) *Attorney, Agent, or Firm* — Senniger Powers LLP

(57) ABSTRACT

Processes are provided for reducing the hydrodynamic friction of a turbulent brine stream including, for example, the step of injecting a mixture of a finely divided free flowing friction reducing powder into the turbulent brine stream, wherein the particles of the powder have a primary particle size between 10 and 100 microns in average particle diameter, and the brine stream comprises water with at least 90,000 ppm total dissolved solids, wherein the total dissolved solids includes at least 30,000 ppm sodium cations, 10,000 ppm calcium cations, and 1,000 ppm magnesium cations, and wherein the brine has an electrical conductivity of greater than 100.0 mS/cm at 25° C. For use with a harsher brine, the particles preferably have a primary particle size between 10 and 53 microns in average particle diameter. The friction reducing powder may, for example, be a polyacrylamide polymer.

25 Claims, 2 Drawing Sheets

(51) Int. Cl.
*C09K 8/84* (2006.01)
*C09K 8/88* (2006.01)

(56) References Cited

U.S. PATENT DOCUMENTS

| | | |
|---|---|---|
| 4,584,244 A | 4/1986 | Fenton |
| 4,842,486 A | 6/1989 | Neubauer |
| 5,534,169 A | 7/1996 | Vinci |
| 7,846,878 B2 | 12/2010 | Robb et al. |
| 2003/0191030 A1 | 10/2003 | Blair et al. |
| 2005/0239663 A1* | 10/2005 | West ................ C09K 8/12 507/120 |
| 2008/0064614 A1 | 3/2008 | Ahrenst et al. |
| 2009/0298721 A1 | 12/2009 | Robb et al. |
| 2010/0248997 A1 | 9/2010 | Li et al. |
| 2012/0024525 A1 | 2/2012 | Svarczkopf et al. |
| 2012/0035085 A1 | 2/2012 | Parnell et al. |
| 2012/0214714 A1 | 8/2012 | Whitwell et al. |
| 2013/0072405 A1* | 3/2013 | Favero ................ C09K 8/12 507/225 |

OTHER PUBLICATIONS

Supplementary European Search Report issued for EP 13829751.0 on Mar. 23, 2016, 4 pages.

* cited by examiner

ENVIRONMENTALLY BENEFICIAL RECYCLING OF BRINES IN THE PROCESS OF REDUCING FRICTION RESULTING FROM TURBULENT FLOW

CROSS-REFERENCE TO RELATED APPLICATIONS

This application claims priority of U.S. Patent Application Ser. No. 61/684,520 filed on Aug. 17, 2012, which application is incorporated by reference herein.

BACKGROUND OF THE DISCLOSURE

1. Field of the Disclosure

The present invention relates to methods for reducing the friction resulting from turbulent and transitional flow in saline aqueous fluids.

2. Background of the Related Art

In a well stimulation operation, a large amount of fracturing fluid is pumped down a well bore hole under high pressure and at high flow rates to a depth ranging from about 500 meters to 6 kilometers or more, causing the rock formation surrounding the well bore to fracture. The pressure is then relieved allowing the oil to seep through the fractures into the well bore where the oil is pumped out of the well bore to the surface.

The turbulence produced as the fracturing fluid is pumped through the pipe under pressure results in the production of friction, thereby increasing the amount of energy required to move the amount of fluid at the same speed. In applications such as coiled tubing drilling (CTD) a hydraulicly powered device sometimes referred to as a "mud motor" is fixed to the end of a long, narrow section of coiled tubing (CT). When a fluid is pumped at high velocity through coiled tubing that has been deployed appropriately in an oil well, the fluid flow causes the "mud motor" to turn a drill bit at high rates of rotation and to excavate material encountered in the path of the drill bit. The material excavated by the drill bit may be subterranean rock at the bottom of the well or a temporary plug that has been emplaced in a well at or toward the "toe" of the well and in front of a hydraulicly fractured zone so that an additional hydraulicly fractured zone can be emplaced at a location at or somewhat more toward the "heel" of the well. Unfortunately, when the fracturing fluid is pumped at high velocity through the coiled tubing, the pressure of the fluid being pumped into the coiled tubing may rise to unacceptable values, stressing the coiled tubing to its mechanical limit and reducing its lifetime for subsequent reuse in similar operations. Therefore, it is desirable to reduce the hydrodynamic drag or hydrodynamic friction in the coiled tubing by injecting a drag or friction reducing material into the fracturing fluid.

Generally, high molecular weight linear polymers, referred to as friction reducers, are used to alter the rheological properties of a fluid so that the turbulent flow is minimized, thereby reducing energy loss in the fluid as it is pumped through the pipe. A good friction reducer will cause a fluid to experience a large decrease in friction at small concentrations within the fluid, and will have a high level of shear stability, temperature stability, and pressure stability.

Standard latex polymers may be made with suitable molecular weights for use as friction reducers, but such standard latex emulsion polymers are solids that must be dispersed in a hydrocarbon solvent and stabilized with surfactants. However, these standard latex polymers are of limited utility as friction reducers due to the environmental unfriendliness of the hydrocarbon solvent and surfactants, for example in the case of spill or discharge on land or on an off shore platform. The latex polymers also must be inverted prior to use, which involves the use of additional surfactants.

BRIEF SUMMARY OF THE INVENTION

One embodiment of the present invention provides a process for reducing hydrodynamic friction of a turbulent brine stream comprising injecting into the turbulent brine stream a mixture of a finely divided free flowing friction reducing powder, wherein the friction reducing powder is an acrylamide-containing polymer having the number average molecular weight in the range of 1000 to 30,000,000 g/mol and is polymerized from at least one of the monomers acrylamide, acrylic acid, acrylate salts, dimethylacrylamide, dimethylacrylic acid, and dimethylacrylate salts, wherein 80% of the particles by weight in the powder have an average particle diameter between 10 and 100 microns, wherein the brine stream comprises water with at least 90,000 ppm total dissolved solids, wherein the total dissolved solids include at least 30,000 ppm sodium cations, at least 10,000 ppm calcium cations, and at least 1,000 ppm magnesium cations, and wherein the brine has an electrical conductivity of greater than 50.0 mS/cm at 25° C.

Another embodiment of the present invention provides a kit for reducing hydrodynamic friction of a turbulent brine stream, the kit comprising a carrier containing a mixture of a finely divided friction reducing powder, wherein the particles have a primary particle size between 10 and 100 microns in average particle diameter; a metering means for metering the friction reducing powder; wherein the carrier and the metering means are coupled to a conduit containing the turbulent brine stream, wherein the brine stream comprises water with at least 90,000 ppm total dissolved solids, wherein the total dissolved solids include at least 30,000 ppm sodium cations, at least 10,000 ppm calcium cations, and at least 1,000 ppm magnesium cations, and wherein the brine has an electrical conductivity of greater than 50.0 mS/cm at 25° C.; and instructions for configuring the carrier and metering means to reduce the hydrodynamic friction of a turbulent brine stream. Suitable examples of carriers include marine portable tanks (MPT's), tote tanks, drums, and feeder-containers having V-shaped bottoms and a ball valve or the like at the lowest point in the V-shaped bottom. Other suitable examples for use in our processes would be apparent to one skilled in the art.

DETAILED DESCRIPTION

Figure 1:
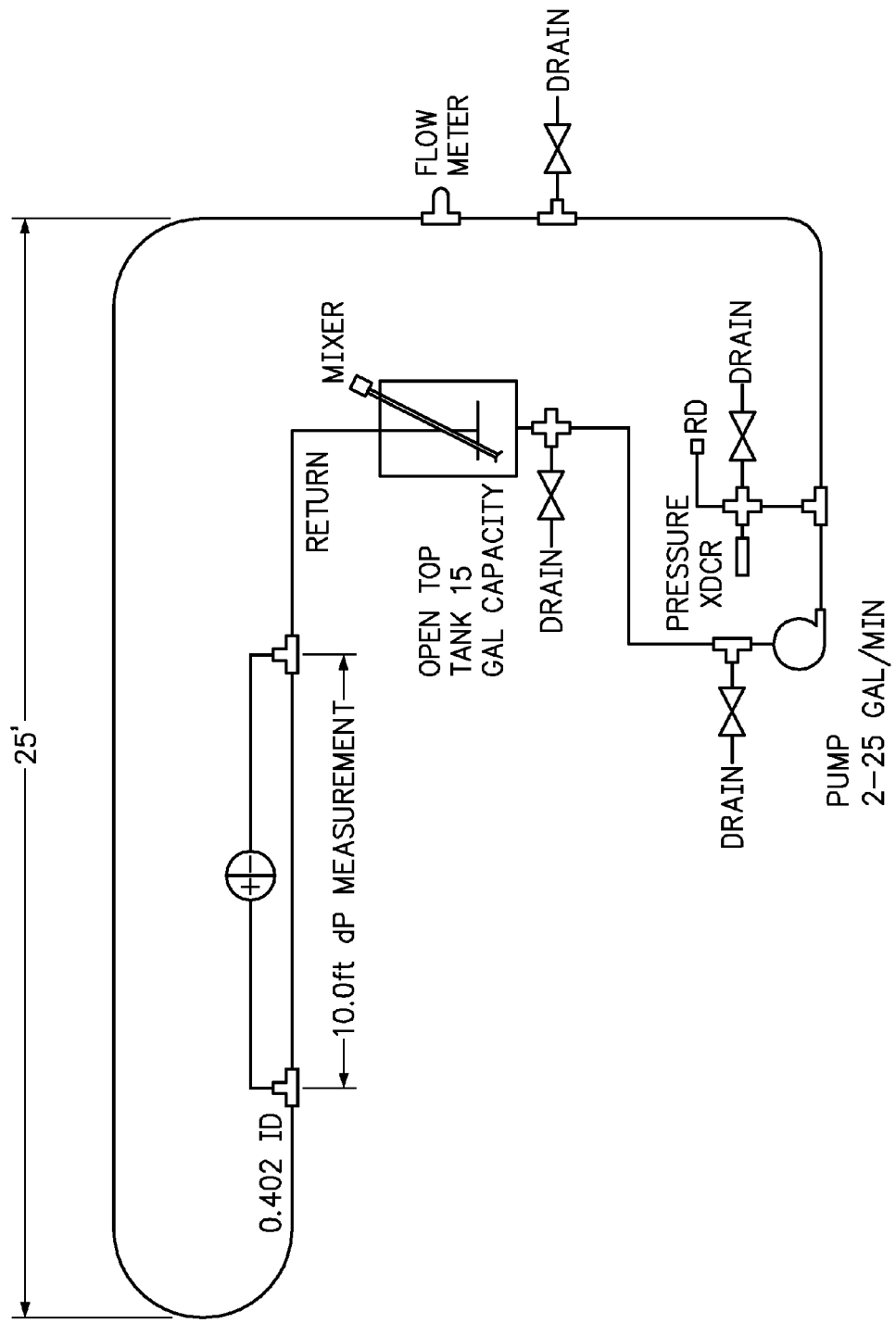
FIG. 1 is a drawing of a flow loop apparatus used to develop the data presented in the Examples.

One embodiment of the present invention provides a process for reducing hydrodynamic friction of a turbulent brine stream during an oil field pumping operation comprising injecting into the turbulent brine stream a mixture of a finely divided free flowing friction reducing powder, wherein the friction reducing powder is an acrylamide-containing polymer having a number average molecular weight in the range of 1000 to 30,000,000 g/mol and is polymerized from at least one of the monomers acrylamide, acrylic acid, acrylate salts, dimethylacrylamide, dimethylacrylic acid, and dimethylacrylate salts, wherein 80% of the particles by weight in the powder have an average particle diameter between 10 and 100 microns, wherein the brine stream comprises water with at least 90,000 ppm total dissolved solids, wherein the total dissolved solids include at least 30,000 ppm sodium cations, at least 10,000 ppm calcium cations, and at least 1,000 ppm magnesium cations, and wherein the brine has an electrical conductivity of greater than 50.0 mS/cm at 25° C.

In a non-limiting example, the brine may comprise water with at least 200,000 ppm total dissolved solids, wherein the total dissolved solids include at least 70,000 ppm sodium cations, at least 40,000 ppm calcium cations, and at least 5,000 ppm magnesium cations, and wherein the brine has an electrical conductivity of greater than 100.0 mS/cm at 25° C.

In another embodiment, the friction reducing powder may be treated with at least one anti-caking additive or compound selected from magnesium stearate, calcium stearate, aluminum stearate, docusate sodium, sodium bicarbonate, cellulose, tricalcium phosphate, sodium ferrocyanide, potassium ferrocyanide, sodium silicate, silicon dioxide, calcium silicate, magnesium trisilicate, talcum powder, sodium aluminosilicate, potassium aluminum silicate, calcium aluminosilicate, bentonite, aluminum silicate, stearic acid, polydimethylsiloxane, diatomaceous earth, sodium chloride, vermiculite, magnesium sulfate, and calcium sulfate. These compounds may be used to promote, during normal storage conditions, the free flow of the friction reducing powder and to control the rate at which the friction reducing powder dissolves in the aqueous brine stream so as to minimize agglomeration of the friction reducing powder during dissolution thereof. One preferred example uses about 0.1 to 20 parts by weight of the anti-caking additive per 100 parts by weight of the friction reducing powder in the mixture.

Optionally, the friction reducing powder may be mixed with water or brine to form a slurry before injecting the slurry into the turbulent brine stream. In a further option, the slurry may be injected into the brine stream less than 7 seconds after first mixing the friction reducing powder with water or brine so that injection will precede any appreciable dissolution of the friction reducing powder.

In a further embodiment of the process, the friction reducing powder may comprise at least one homo-, co-, ter-, or quater-polymer having a number average molecular weight in the range of 1,000 to 30,000,000 g/mol and is polymerized from at least one of the monomers acrylamide, acrylic acid, acrylate salts, dimethylacrylamide, dimethylacrylic acid, and dimethylacrylate salts, wherein 2-acrylamido-2-methylpropane sulfonic acid comprises 0.0001 to 20% of the total monomers in the polymer or acrylamido-2-methylpropane sulfonate salts comprise 0.0001 to 20% of the total monomers in the polymer. Optionally, the 2-acrylamido-2-methylpropane sulfonic acid or the 2-acrylamido-2-methylpropane sulfonate salts may comprise from 0.0001 to 15% of the total monomers, from 0.0001 to 10% of the total monomers, or from 0.0001 to 5% of the total monomers.

In yet another embodiment, the drag reducing powder may be mixed with mineral oil to form a dispersion. Accordingly, the step of injecting the drag reducing powder into the turbulent brine stream includes injecting the disperion into the turbulent brine stream. Optionally, the dispersion may contain a dispersion aid to ensure that the polymer particles do not settle. In a non-limiting example, the dispersion may include between 20 and 55 weight percent of the drag reducing powder in the mineral oil.

In a still further embodiment, the drag reducing powder may be mixed with a non-hydrating fluid such as dipropylene glycol methyl ether, dipropylene glycol methyl ether acetate, dipropylene glycol butyl ether, dipropylene glycol propyl ether, propylene glycol methyl ether, propylene glycol butyl ether, propylene glycol methyl ether, tripropylene glycol butyl ether, or tripropylene glycol methyl ether to form a dispersion. Accordingly, the step of injecting the drag reducing powder into the turbulent brine stream includes injecting the disperion into the turbulent brine stream. Optionally, the dispersion may contain a dispersion aid to ensure the polymer particles do not settle. In a non-limiting example, the dispersion may include between 20 and 55 weight percent of the drag reducing powder in the non-hydrating.

The process of reducing hydrodynamic friction of a turbulent brine stream, as described in one or more embodiment described above, may include injecting the mixture into the turbulent brine stream during an oil field pumping operation, a hydraulic fracturing operation, or a coiled tubing pumping or coiled tubing drilling operation. The process may also be applicable to reducing hydrodynamic friction of a turbulent brine stream in various other applications.

Another embodiment of the present invention provides a kit for reducing hydrodynamic friction of a turbulent brine stream, the kit comprising a carrier containing a mixture of a finely divided friction reducing powder, wherein the particles have a primary particle size between 10 and 100 microns in average particle diameter; a metering means for metering the friction reducing powder; an optional microprocessor which receives feedback from a pressure gauge and adjusts the feed rate of the friction reducing powder; wherein the carrier and the metering means are coupled to a conduit containing the turbulent brine stream, wherein the brine stream comprises water with at least 90,000 ppm total dissolved solids, wherein the total dissolved solids include at least 30,000 ppm sodium cations, at least 10,000 ppm calcium cations, and at least 1,000 ppm magnesium cations, and wherein the brine has an electrical conductivity of greater than 50.0 mS/cm at 25° C.; and instructions for configuring the carrier and metering means to reduce the hydrodynamic friction of a turbulent brine stream.

Non-limiting examples of carriers include marine portable tanks (MPT's), tote tanks, drums, and feeder-containers having V-shaped bottoms and a ball valve or the like at the lowest point in the V-shaped bottom. Other examples of a suitable carrier for use in the processes of the present invention will be apparent to one skilled in the art.

One embodiment provides a process of using a powder formed by an acrylamide polymer ground to a particle size in the 10 to 100 micron average particle diameter range to rapidly reduce the hydrodynamic friction in a flowing brine stream comprising water with at least 90,000 ppm total dissolved solids, of which at least 90,000 ppm total comprises at least 30,000 ppm sodium cations, at least 10,000 ppm calcium cations, and at least 1,000 ppm magnesium cations. One skilled in the art would readily obtain the ground friction reducer with a particle size, for example, of 10-100 microns by grinding it with a unit such as, for example, a Standard Fitzmill Comminutor, available from the Fitzpatrick company, 832 Industrial Drive, Elmhurst, Ill. 60126. One of skill in the art would also be able to remove the particles less than 10 microns in diameter and those larger than 100 microns in diameter by using sieves.

For the purposes of the present disclosure, when, for example, a particle size is specified to be in the 10 to 100 micron average particle diameter range, it is meant that at least 80% of the particles fall within the specified range. For the purposes of the present disclosure, the term "homopolymer" means a polymer produced from only one type of monomer; the term "copolymer" means a polymer produced from two types of monomer; the term "terpolymer" means a polymer produced from three types of monomer; the term "quaterpolymer" means a polymer produced four types of monomer; and the term "at least one homo-, co-, ter-, or quarter-polymer" means a polymer selected from the list of polymers produced from only one type of monomer or from two, three, or four types of monomer.

For the purposes of the present disclosure, the term "powder" is a dry, bulk solid composed of a large number of very fine particles that may flow freely when shaken or tilted. Powders are a special sub-class of granular materials, although the terms powder and granular are sometimes used to distinguish separate classes of material. In particular, powders refer to those granular materials that have the finer grain sizes, and that therefore have a greater tendency to form clumps when flowing. Granulars refers to the coarser granular materials that do not tend to form clumps except when wet. As defined here and used herein, the term "free flowing powder" would include material containing up to 15% by weight water and/or up to 5% by weight non-aqueous solvent, yet the powder does not clump and remains free flowing. Examples of powders would include flour, ground coffee, powdered milk, cosmetic powders, gunpowder, powdered sugar, fine snow, household dust, volcanic ash, the top layer of the lunar regolith, copy machine toner, and many pharmaceuticals. Typically, a powder can be compacted or loosened into a vastly larger range of bulk densities than can a coarser granular material. When deposited by sprinkling, a powder may be very light and fluffy. When vibrated or compressed it may become very dense and even lose its ability to flow. The bulk density of coarse sand, on the other hand, does not vary over an appreciable range. The clumping behavior of a powder arises because of the molecular Van der Waals force that causes individual grains to cling to one another. Actually, this force is present not just in powders, but in sand and gravel, too. However, in such coarse granular materials, the weight and the inertia of the individual grains are much larger than the very weak Van der Waals forces, and therefore the tiny amount of clinging between grains does not have a dominant effect on the bulk behavior of the material. Only when the grains are very small and lightweight does the Van der Waals force become predominant, causing the material to clump like a powder. Many other powder behaviors are common to all granular materials. These include segregation, stratification, jamming and unjamming, fragility, loss of kinetic energy, frictional shearing, compaction and Reynolds' dilatancy. Powders are transported in the atmosphere differently from a coarse granular material. For one thing, tiny particles have little inertia compared to the drag force of the gas that surrounds them, and so they tend to go with the flow instead of traveling in straight lines. Also, if powder particles are sufficiently small, they may become suspended in the atmosphere for a very long time. Random motion of the air molecules and turbulence provide upward forces that may counteract the downward force of gravity. Coarse granulars, on the other hand, are so heavy that they fall immediately back to the ground. Once disturbed, dust may form huge dust storms that cross continents and oceans before settling back to the surface. This actually explains why there is relatively little hazardous dust in the natural environment. Once aloft, the dust is very likely to stay aloft until it meets water in the form of rain or a body of water. The aerodynamic properties of powders are often used to transport them in industrial applications. Pneumatic conveying is the transport of powders or grains through a pipe by blowing gas. A gas fluidized bed is a container filled with a powder or granular substance that is fluffed up by blowing gas upwardly through it. This is used for fluidized bed combustion, chemically reacting the gas with the powder. A paste or gel might become a powder after it has been thoroughly dried, but is not considered a powder when it is wet because it does not flow freely. Substances like dried clay, although dry bulk solids composed of very fine particles, are not powders unless they are crushed because they have too much cohesion between the grains, and therefore they do not flow freely like a powder. A liquid flows differently than a powder, because a liquid cannot resist any shear stress and therefore it cannot reside at a tilted angle without flowing (that is, it has zero angle of repose.) A powder on the other hand is a solid, not a liquid, because it may support shear stresses and therefore may display an angle of repose.

Another embodiment of the process uses free-flowing powder acrylamide polymer ground to a particle size in the 10 to 100 micron average particle diameter range to rapidly reduce the hydrodynamic friction in a flowing brine stream comprising water with at least 200,000 ppm total dissolved solids, of which at least 200,000 ppm total comprises at least 70,000 ppm sodium cations, at least 40,000 ppm calcium cations, and at least 5,000 ppm magnesium cations.

Polymers used in the disclosed processes include, for example, at least one homo-, co-, ter- or quater-polymer having the number average molecular weight in the range of 1000 to 30,000,000 g/mol and polymerized from at least one of the monomers acrylamide, acrylic acid, acrylate salts, dimethylacrylamide, dimethylacrylic acid, dimethylacrylate salts, styrene sulfonic acid, styrene sulfonate salts, 2-acrylamido-2-methylpropane sulfonic acid, 2-acrylamido-2-methylpropane sulfonate salts, ethylidene norbornene sulfonic acid, ethylidene norbornene sulfonate salts, vinyl acetate, vinyl alcohol, vinyl pyridine, vinyl pyrrolidone, vinyl pyrridinone, or cationic monomers in accordance with the Markusch formulae presented in FIG. I through V:

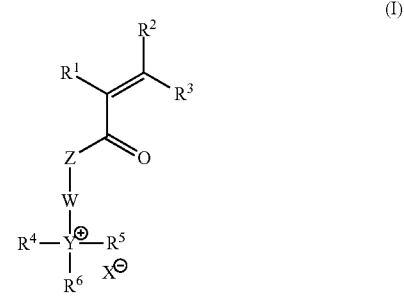

(I)

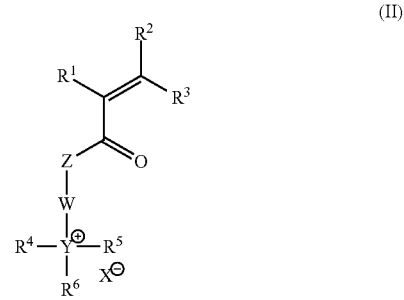

(II)

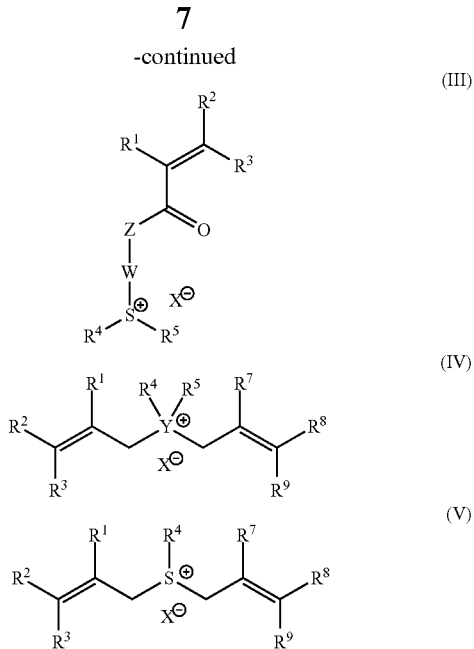

With respect to these structures illustrated in FIG. I through V, $R^1$ may be independently selected from H (hydrogen) or methyl (CH3); $R^2$ may be independently selected from H (hydrogen), halide (fluoride, chloride, bromide, iodide), C1 through C6 alkyl or alkoxy, aryl, linear or branched oligomeric or polymeric dimethyl siloxane; $R^3$ may be independently selected from hydroxyl, alkyl amine, dialkyl amine or polyether; $R^4$ may be independently selected from H (hydrogen), C1 through C6 alkyl, or benzyl; $R^5$ through $R^9$ may be independently selected from H (hydrogen), halide (fluoride, chloride, bromide, iodide), C1 through C10 alkyl or C6 through C12 aryl; S may be independently selected from sulfur or selenium; Y may be independently selected from N (nitrogen) or P (phosphorus); Z may be independently selected from O (oxygen) or NH; W may be independently selected from C1 through C6 alkyl; and X may be independently selected from fluoride, chloride, bromide, iodide, methosulfate or ethosulfate.

One embodiment provides a process for reducing the hydrodynamic friction of a turbulent, high salinity, brine stream comprising the step of injecting into the turbulent aqueous stream a mixture of a finely divided free flowing friction reducing powder, wherein the particles have a primary particle size between 10 and 100 microns in average particle diameter, wherein the particles comprise a powdered solid, water-soluble, non-dispersion, AMPS-free, polyacrylamide polymer and the brine stream consists of water with at least 90,000 ppm total dissolved solids, and comprising at least 30,000 ppm sodium cations, at least 10,000 ppm calcium cations, and at least 1,000 ppm magnesium cations, and wherein the brine has an electrical conductivity of greater than 1.0 mS/cm at 25° C.

In remote drilling locations, it is desirable to utilize recycled brines as the fracturing fluid instead of scarce and costly fresh water. Brine recycling also reduces the quantity of used brine that must be disposed of. However, it remains important in such reused brines that the hydrodynamic-friction-reducers will not diminish in their performance, which is measured in terms of the rapid hydration and yielding of the polymers so that they become active in reducing friction. The ability to effectively and rapidly reduce turbulent flow of heavy brines using a friction reducer will help operators avoid using millions of gallons of fresh water. The environmental benefits are complemented by the economic advantages of being able to use produced water or recycled water that has been previously weighted with various salts.

In another embodiment, the polymer is made with AMPS, 2-acrylamido-2-methylpropane sulfonic acid or 2-acrylamido-2-methylpropane sulfonate salts, as one of the co-monomers, but its amount is limited to the range from 0.0001 to 10% of the total monomers. These monomers are used quite effectively to enhance the solubility of polyacrylamide-based friction reducers in heavy brines. However, the final polymers are significantly more expensive than polyacrylamide, as these monomers are several times the price of acrylamide and must be used in molar concentrations exceeding 10% to be effective. Our technology provides a substantial benefit in the form of a cost advantage, as molar concentrations well below 10% AMPS can be used to enhance solubility of polyacrylamide-based polymers when the primary particle size is between 10 and 100 microns.

One embodiment of the process involves applying to the friction reducing powder, a hydrophobic powder to inhibit caking, promote free flow of the powder, and control (decrease) the rate at which the powder dissolves to minimize agglomeration. Optionally, the process could involve an added step of mixing the powders with water to form a slurry which is then injected into the turbulent water stream. Up to 20 parts (by weight) hydrophobic powder to 100 parts friction reducing powder would be included. The hydrophobic powder coating particle size should be between 0.001 and 100 microns. Examples of such hydrophobic powders include polyethylene oxide (PEO) and methylsilyl modified fumed silicon dioxide. In another embodiment of the process the optional anti-caking additive can, optionally, be a hydrophilic additive, such as, for example, sulfonate salts and polymers such as carboxymethylcellulose, polyvinylpyrrolidone, croscarmellose sodium, starch, and the like, which are commonly used as excipients in pharmaceutical formulations.

The processes may include using powdered solid, water-soluble, non-dispersion polymers to reduce friction or hydrodynamic friction resulting from turbulent flow and transitional flow in an aqueous fracturing fluid as it is pumped at high velocity through relatively narrow conduits such as, for example, oil well casings or tubing strings and coiled tubing (CT). One embodiment of these processes concerns methods of reusing brines even though the salinity of the brine has built up substantially (for example, the brine has concentrated from a moderate brine to a harsh brine) through repeated re-use, and at the same time of applying powdered solid, water-soluble, non-dispersion, friction-reducing polymers having a particle size that allow the polymers to hydrate readily in said reused brines and rapidly become active at reducing said friction or hydrodynamic drag.

The processes may also, optionally, include the mixing of the drag reducing powder with mineral oil to form a dispersion, and then injecting the disperion into the turbulent brine stream.

EXAMPLES

In Examples 1 through 4, pressure reduction experiments were carried out on a recirculating flow loop using 18 gallons fresh water, API standard brine (9% NaCl and 1% CaCl$_2$), or a very harsh brine. The composition of the fresh water was determined to be much less than 5,000 ppm total dissolved solids, comprising much less than 3,000 ppm sodium cations, much less than 1,000 ppm calcium cations, and much less than 100 ppm magnesium cations. The composition of the API standard brine was determined to be 95,000 ppm total dissolved solids, comprising 51,000 ppm sodium cations, 6,000 ppm calcium cations, and 50 ppm magnesium cations. The composition of the very harsh brine was determined to be 200,000 ppm total dissolved solids, comprising 90,000 ppm sodium cations, 35,000 ppm calcium cations, and 15,000 ppm magnesium cations.

FIG. 1 is a drawing of a flow loop apparatus used to develop the data presented in these Examples. The flow loop apparatus includes a straight section with an internal diameter of 0.402". This section is part of a circuitous flow loop that begins and ends in an 18 gallon open top tank or reservoir, which was filled with the brine being studied and mechanically stirred at 1000 rpm. From this reservoir, the brine was pumped through the loop and back into the reservoir. With no friction reducer present at first, pumping was initiated. Once the flow and pressure transducers had stabilized, the powdered solid or emulsion-based friction reducer was added directly into the top of the reservoir. The pressure drop was measured over the section of pipe with an internal diameter of 0.402" in length, which was 10 feet long. The Reynolds number obtained was >117,000 for the 0.402" pipe section.

The water or brine was circulated through the flow loop at a rate of 15 gallons per minute and maintained at about 80° F. for the duration of the experiment. The pressure drop over the 10 foot section with an internal diameter of 0.402", along with other relevant data, was collected at 1 second intervals for a period of 30 minutes after the addition of the friction reducer. The pressure drop at any given time was used to calculate the percent friction reduction according to the formula:

$$\% \ FR = 100 \times \frac{DP_0 - DP_i}{Dp_0}$$

where:
% FR=Percentage friction reduction
$DP_0$=Pressure drop of untreated fluid
$DP_i$=Pressure drop of fluid treated with powdered friction reducer Example 1

Unground Polyacrylamide

In Example 1, the fluid flowing in the flow-loop was either an API standard brine or a very harsh brine. From the experimental procedure described above, data were collected and are summarized in Table 1:

TABLE 1

Relevant data for the unground dry polymer

| Parameter | API Brine | Very Harsh Brine |
|---|---|---|
| $T_{50}$ (s) | 155 seconds | 1170 seconds |
| $T_{70}$ (s) | — | — |
| $T_{max}$ (s) | 1100 seconds | 1500 seconds |
| Maximum Friction Reduction Observed | 63% | 51% |

In Table 1, the parameter "$T_{50}(s)$" stands for the amount of time in seconds that elapsed after addition of the friction reducer into the fluid until the friction reducer provided a 50% reduction in friction. Similarly, "$T_{70}(s)$" stands for the amount of time in seconds that elapsed after addition of the friction reducer into the fluid until the friction reducer provided a 70% reduction in friction, and "$T_{max}(s)$" stands for the amount of time in seconds that elapsed after addition of the friction reducer into the fluid until the friction reducer provided its maximum percentage reduction in friction.

The solid, water-soluble, non-dispersion polymer in this Example was a polyacrylamide that had a $D_{10}$ of about 400 microns, a $D_{50}$ of about 800 microns, and a $D_{90}$ of about 1000 microns. $D_{10}$, $D_{50}$, and $D_{90}$ are terms defined relative to the particle size distribution in a mixture of particles, with $D_{10}$ being the particle diameter equal to or below which there are to be found only the finest 10% of the weight of the material in the mixture; $D_{50}$ being the particle diameter equal to or below which there are to be found only the finest 50% of the weight of the material in the mixture; and $D_{90}$ being the particle diameter equal to or below which there are to be found only the finest 90% of the weight of the material in the mixture. Accordingly, the polymer was very coarse and is therefore characterized it as "unground polyacrylamide". The polymer was applied into the fluid as a friction reducer at a rate of 2.67 pounds ($lb_m$) per thousand gallons of brine. The data in Table 1 show that the unground polyacrylamide was relatively slow in hydrating and yielding its hydrodynamic friction reduction. Specifically, after 300 seconds the % Friction Reduction was only about 55% in the API standard brine and even lower, less than 39% in the very harsh brine. The unground polyacrylamide never did reach a 70% reduction in friction.

Example 2

Emulsion Polymer

In Example 2, the fluid flowing in the flow-loop was an API standard brine or a very harsh brine. From the experimental procedure described above, the collected data have been summarized and tabulated in Table 2:

TABLE 2

Relevant data for the Kemira A-4370 emulsion polymer

| Parameter | API Brine | Very Harsh Brine |
|---|---|---|
| $T_{50}$ (s) | 11 seconds | 101 seconds |
| $T_{70}$ (s) | 30 seconds | — |
| $T_{max}$ (s) | 82 seconds | 160 seconds |
| Maximum Friction Reduction Observed | 75% | 53% |

The polymer in this Example was an emulsion polymer A-4370 available commercially from Kemira Chemicals, Inc., 387 Technology Circle, Suite 300, Atlanta, Ga. 30313. The polymer was applied at a rate of 1 gallon per thousand gallons of brine. The dosage rate of 1 gallon per thousand gallons of brine for the emulsion polymer in this Example is equivalent to a rate of 2.67 pounds per thousand gallons of brine. The data in Table 2 show that the Kemira A-4370 emulsion polymer was sometimes relatively fast in hydrating and yielding its hydrodynamic friction reduction. Specifically, after 30 seconds the % Friction Reduction was about 76% in the tap water and just under 70% in the API standard brine but still less than 30% in the very harsh brine. In both the API standard brine and the very harsh brine, the Kemira A-4370 emulsion polymer out-performed the unground polyacrylamide used in Example 1. It is well-known that emulsion polymers hydrate much more rapidly, and therefore provide more rapid development of friction reduction, than powdered friction reducers.

Example 3

Finely Ground Polyacrylamide

In Example 3, the fluid flowing in the flow-loop was either an API standard brine or a very harsh brine. From the experimental procedure described above, the collected data have been summarized and tabulated in Table 3:

TABLE 3

Relevant data for the finely ground dry polymer in API and very harsh brine.

| Parameter | Dry Polymer 10-100 Microns in API Brine | Dry Polymer 10-100 Microns in Very Harsh Brine | Dry Polymer 10-53 Microns in Very Harsh Brine |
|---|---|---|---|
| $T_{50}$ (s) | 8 seconds | 11 seconds | 7 seconds |
| $T_{70}$ (s) | 15 seconds | 36 seconds | 15 seconds |
| $T_{max}$ (s) | 30 seconds | 51 seconds | 30 seconds |
| Maximum Friction Reduction Observed | 75% | 72% | 75% |

The polymer in this Example was a powdered solid, water-soluble, non-dispersion polyacrylamide polymer, ground into the 10 to 100 microns range in two cases and into the 10 to 53 microns range in one case. The polymer was applied to the fluid at a rate of 2.67 pounds per thousand gallons of brine. The data in Table 3 shows that the performance of polyacrylamide as a friction reducer, namely the speed in hydrating and yielding its hydrodynamic friction reduction, was considerably improved by the grinding that was applied to the unground polyacrylamide whose poor performance was detailed in Example 1. Furthermore, the improvement was so marked that the polyacrylamide ground to the range of 10 to 100 microns and applied in an API standard brine reached 70% Friction Reduction in less than 15 seconds, whereas the Kemira A-4370 emulsion polymer (see Table 2) took nearly 30 seconds to reach 70% Friction Reduction. The performance of the polyacrylamide ground to between 10 and 100 microns exceeded that of the emulsion polymer.

It can be seen in Table 3 that the polyacrylamide ground to 10 to 100 microns and applied in the very harsh brine reached 70% Friction Reduction in less than 36 seconds, comparable to the performance of the Kemira A-4370 emulsion polymer even in standard API brine (see Table 2). It can be seen in Table 3 that the polyacrylamide ground to 10 to 53 microns and applied in the very harsh brine reached 70% Friction Reduction in less than 15 seconds, exceeding the performance of the Kemira A-4370 emulsion polymer even in standard API brine.

It would appear that the performance of the powdered solid, water-soluble, non-dispersion polymer improves with grinding to a point, and then improves no further in a moderately harsh brine like the API standard brine. This is also true for the performance of the polymer in much harsher brine, but the point at which the performance plateau is reached is at 10 to 100 microns for the API standard brine and 10 to 53 microns for the much harsher brine. This is important in that it allows an economical compromise to be reached between the added cost of grinding the polymer and the added benefit of grinding to a smaller size. Since grinding to smaller than 10-100 microns offers no further increase in the rate of hydration of the powdered friction reducer in API brine, such grinding would be an unnecessary expense that increases the cost to manufacture the powdered friction reducer. Similarly, grinding to an average particle size smaller than 10-53 microns offers no further increase in the rate of hydration of the powdered friction reducer in very harsh brine, and such grinding represents an additional cost of manufacturing the powdered friction reducer. This 'sweet spot' provides the economical advantage associated with maximizing the hydration rate of the powdered polymer while minimizing the costs associated with grinding.

It should be noted here that this excellent performance in harsh brines has been achieved with this powdered solid, water-soluble, non-dispersion polyacrylamide polymer that is "free" of AMPS. The polymer is considered to be "free" of AMPS since the 2-acrylamido-2-methylpropane sulfonic acid comprises no more than 0.0001% of the total monomers comprising the polymer, and the 2-acrylamido-2-methylpropane sulfonate salt comprises no more than 0.0001% of the total monomers comprising the polymer. This is an important attribute to this powdered solid, water-soluble, non-dispersion polyacrylamide polymer, inasmuch as the AMPS monomer is very expensive.

Example 4

In Example 4, the fluid flowing in the flow-loop was either an API standard brine or a very harsh brine. From the experimental procedure described above, the collected data have been summarized and tabulated in Table 4:

TABLE 4

Relevant data for the emulsion polymers in API and very harsh brine.

| Parameter | Kemira A-4251 in API Brine | Kemira A-4155 in Very Harsh Brine | Kemira A-4251 Very Harsh Brine |
|---|---|---|---|
| $T_{50}$ (s) | 10 seconds | 33 seconds | 22 seconds |
| $T_{70}$ (s) | 15 seconds | — | — |
| $T_{max}$ (s) | 30 seconds | 135 seconds | 93 seconds |
| Maximum Friction Reduction Observed | 78% | 67% | 69% |

The polymers in this Example were emulsion polymers A-4155 and A-4251 available commercially from Kemira Chemicals, Inc., 387 Technology Circle, Suite 300, Atlanta, Ga. 30313. The manufacturer characterizes these emulsion polymers as specialty (i.e., more expensive than their A-4370) and especially formulated to be tolerant of heavy brines. The polymers were applied into the brines at a rate of 1 gallon per thousand gallons of brine. The dosage rate of 1 gallon per thousand gallons of brine for the emulsion polymers in this Example is equivalent to a rate of 2.67 pounds per thousand gallons of brine. The data in Table 4 show that the Kemira A-4251 emulsion polymer was relatively fast in hydrating and yielding its hydrodynamic friction reduction in the API standard brine and the Kemira A-4155 and A-4251 emulsion polymers were only a little slower in the very harsh brine. However, comparing the data from Table 4 with that of Table 3, the powdered solid, water-soluble, non-dispersion, AMPS-free, polyacrylamide polymer ground to 10 to 53 microns showed much better performance in the very harsh brine in terms of reaching 70% Friction Reduction more quickly than the specialty, heavy-brine-tolerant, Kemira A-4155 and A-4251 emulsion polymers. Apparently they are more heavy-brine-tolerant than the Kemira A-4370, but less heavy-brine-tolerant than the powdered solid, water-soluble, non-dispersion, AMPS-free, polyacrylamide polymer ground to 10 to 53 microns. This result is considered to be very surprising.

There is an added benefit from the seemingly minor extra density of the heavier brines in that the extra hydrostatic pressure helps significantly to lower the inlet pressure on a coiled tubing operation. This means that the fluid is much easier to pump at high flow rates, and there is the added benefit that the operating lifetime of the coiled tubing can be greatly extended.

Example 5

In Example 5, the fluid flowing in the flow-loop was either an API standard brine or a very harsh brine. From the experimental procedure described above, the collected data have been summarized and tabulated in Table 5:

TABLE 5

Relevant data for the dry polymer in API standard and very harsh brine.

| Parameter | Dry Polymer 10-100 Microns in API Brine | Dry Polymer 10-53 Microns in API Brine | Dry Polymer 10-100 Microns in the Very Harsh Brine | Dry Polymer 10-53 Microns in the Very Harsh Brine | Dry Polymer 10-38 Microns in the Very Harsh Brine |
|---|---|---|---|---|---|
| $T_{50}(s)$ | 8 seconds | 8 seconds | 11 seconds | 7 seconds | 7 seconds |
| $T_{70}(s)$ | 15 seconds | 15 seconds | 36 seconds | 15 seconds | 15 seconds |
| $T_{max}(s)$ | 30 seconds | 32 seconds | 51 seconds | 30 seconds | 31 seconds |
| Maximum Friction Reduction Observed | 75% | 76% | 72% | 75% | 74% |

The polyacrylamide polymer in this Example was applied to the fluid at a rate of 2.67 pounds per thousand gallons of brine. The data in Table 5 show that in API standard brine there is no significant benefit to grinding the polymer to 10 to 53 microns, compared to 10 to 100 microns, with regard to rate of hydration. Both the 10 to 100 micron polymer material and 10 to 53 micron polymer material reach 70% friction reduction in 15 seconds. However, in the very harsh brine, the polymer ground to 10 to 100 microns takes 36 seconds to reach 70% friction reduction, while the polymer ground to 10 to 53 micron reaches 70% friction reduction in 15 seconds. For the very harsh brine, there is a benefit to grinding to 10 to 53 microns, whereas for the API standard brine there is not.

Example 6

In Example 6, the fluid flowing in the flow-loop was either an API standard brine or a very harsh brine and the polyacrylamide polymer, ground to 10 to 100 microns, was first slurried in mineral oil before admitting the slurry directly into the top of the reservoir, which was mechanically stirred at 1000 rpm. From the experimental procedure described above, the collected data have been summarized and tabulated in Table 6:

TABLE 6

Relevant data for the dry polymer suspension in mineral oil in API and very harsh brine.

| | API Brine | Very Harsh Brine |
|---|---|---|
| $T_{50}(s)$ | 7 | 8 |
| $T_{70}(s)$ | 13 | 24 |
| $T_{max}(s)$ | 21 | 48 |
| Maximum Friction Reduction Observed | 76% | 75% |

The data in Table 6 show that the polymer supplied in slurry form hydrates rapidly in the API Standard Brine and rapidly in the very harsh brine, but takes a few seconds more. While this performance is very good, we believe that it could easily be improved on utilizing dispersing agents added to the slurry. Dispersants suitable for this process include, but are not limited to, linear alkylbenzenesulfonates, fatty alcohol ethoxylates, alkylphenol ethoxylates, lignin sulfonates, metal soaps, or alkylammonium salts.

Figure 2:
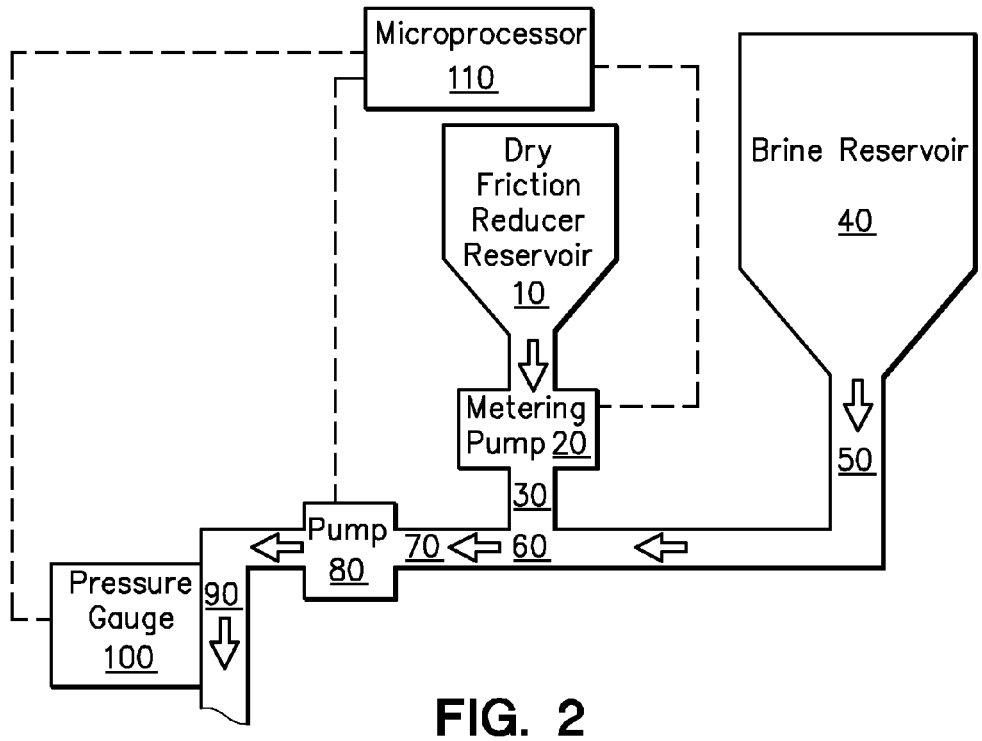
FIG. 2 is an example of a kit that can be used in the oil field to reduce the hydrodynamic friction whenever heavy brines are being pumped through narrow conduits at a high rate.

FIG. 2 is an example of a kit that can be used in the oil field to reduce the hydrodynamic friction whenever heavy brines are being pumped through narrow conduits at a high enough rate that the flow regime changes from laminar flow into the transitional and then into the turbulent flow regimes. The hydrodynamic friction reducing additives are designed to delay the transition from laminar to transitional flow, to extend the transitional flow regime, to delay the changeover from transitional to turbulent flow, and to reduce the friction in both the transitional and turbulent regimes. The items included in the kit comprise a carrier means, labeled in FIG. 2 as "Dry Friction Reducer Reservoir 10", such as a marine portable tank (MPT), tote, drum, or a V-shaped or V-bottomed storage container for transporting the finely divided free flowing friction reducing powder from the warehouse to the wellsite, a metering means, labeled in FIG. 2 as "Metering Pump 20", for metering the friction reducing powder, a conduit 30 for connecting the metering pump to a manifold 60, a brine reservoir 40, a conduit 50 for connecting the brine reservoir 40 to the manifold 60, a conduit 70 for connecting the manifold 60 to a pump 80, a conduit 90 for discharging the effluent of the pump 80 into the oilfield equipment which includes the narrow conduits that will develop friction back-pressure. Optionally, the kit may further include a pressure gauge 100 and a microprocessor 110 which receives feedback from the pressure gauge and adjusts the rate of feeding the friction reducing powder into the flowing brine stream. The dotted lines in FIG. 2 indicate lines of electronic communication. Furthermore, a temperature sensor may also be used to provide a temperature reading that the microprocessor can use to correct the pressure reading in order to calculate a true pressure at some standard condition, say, 70° F. The dotted lines from the microprocessor 110 to the metering pump 20 and the pump 80 may be two-way communication lines through which the microprocessor controls the speed of the pump or of the metering pump, but a temperature sensor in or near the pump or the metering pump may be feeding back to the microprocessor a temperature reading of the pump or of the metering pump so that the microprocessor can assess the performance conditions of the pump or the metering pump. A set of hoses, fittings, and adapters included in the kit are provided in order to serve as the conduit 30, the manifold 60, the conduit 50, the conduit 70, and the conduit 90. Optionally included in the kit, but not illustrated in FIG. 2, is a set of instructions for configuring the carrier and metering means to the hoses, fittings, and inlet in order to reduce the hydrodynamic friction of the flowing brine stream.

Figure 3:
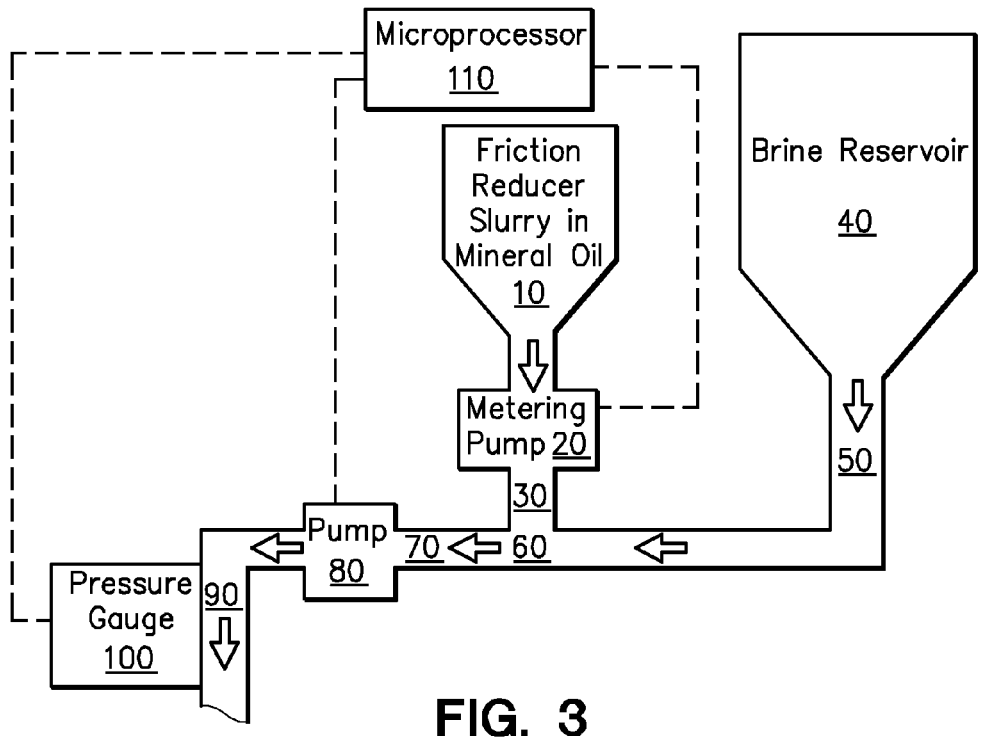
FIG. 3 is another example of a kit that can be used in the oil field to reduce the hydrodynamic friction whenever heavy brines are being pumped at a high rate through narrow conduits.

FIG. 3 is another example of a kit that can be used in the oil field to reduce the hydrodynamic friction whenever heavy brines are being pumped at a high rate through narrow conduits. The dry powder is dispersed as a slurry in a mineral oil carrier fluid or in a non-hydrating fluid such as dipropylene glycol methyl ether, dipropylene glycol methyl ether acetate, dipropylene glycol butyl ether, dipropylene glycol propyl ether, propylene glycol methyl ether, propylene glycol butyl ether, propylene glycol methyl ether, tripropylene glycol butyl ether, or tripropylene glycol methyl ether to form a dispersion. This slurry is disposed in a carrier means and is provided as part of the items included in the kit. Accordingly, the kit comprises a carrier means, labeled in FIG. 3 as "Friction Reducer Slurry Reservoir 10", such as a marine portable tank (MPT), tote, drum, or a V-shaped or V-bottomed storage container for transporting the slurry from the warehouse to the well-site, a metering, labeled in FIG. 3 as "Metering Pump 20", for metering the friction reducing powder, a conduit 30 for connecting the metering pump to a manifold 60, a brine reservoir 40, a conduit 50 for connecting the brine reservoir 40 to the manifold 60, a conduit 70 for connecting the manifold 60 to a pump 80, a conduit 90 for discharging the effluent of pump 80 into the oilfield equipment which includes the narrow conduits that will develop friction back-pressure. The kit may further include an optional pressure gauge 100 and an optional microprocessor 110 which receives feedback from the pressure gauge and adjusts the rate of feeding the friction reducing powder into the flowing brine stream. The dotted lines in FIG. 3 indicate lines of electronic communication. Furthermore, a temperature sensor may also be used to provide a temperature reading that the microprocessor can use to correct the pressure reading in order to calculate a true pressure at some standard condition, say, 70° F. The dotted lines from the microprocessor 110 to the metering pump 20 and the pump 80 may be two-way communication lines through which the microprocessor controls the speed of the pump or of the metering pump, but a temperature sensor in or near the pump or the metering pump may be feeding back to the microprocessor a temperature reading of the pump or of the metering pump so that the microprocessor can assess the performance conditions of the pump or of the metering pump. The set of hoses, fittings, and adapters included in the kit are provided in order to serve as the conduit 30, the manifold 60, the conduit 50, the conduit 70, and the conduit 90. Optionally included in the kit, but not illustrated in FIG. 3, is a set of instructions for configuring the carrier and metering means to the hoses, fittings, and inlet in order to reduce the hydrodynamic friction of the flowing brine stream.

The foregoing description includes reference to various embodiments of the invention. It should be understood that the features or elements of one embodiment are not exclusive to that embodiment and may combined with features or elements of another embodiment. Other terminology used herein is for the purpose of describing particular embodiments only and is not intended to be limiting of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the presently claimed invention has been presented for purposes of illustration and description, but it not intended to be exhaustive or limited to the invention in the form disclosed. Many modifications and variations will be apparent to those of ordinary skill in the art without departing from the scope and spirit of the invention. The embodiments disclosed were chosen and described in order to best explain the principles of the invention and the practical application, and to enable others of ordinary skill in the art to understand and use the invention for various embodiments with various modifications as are suited to the particular use contemplated.

What is claimed is:

1. A process for reducing hydrodynamic friction of a turbulent brine stream during an oil field pumping operation comprising: injecting into the turbulent brine stream a finely divided free flowing friction reducing powder, wherein the friction reducing powder comprises an acrylamide-containing polymer having a number average molecular weight in the range of 1000 to 30,000,000 g/mol and being derived from at least one of the monomers acrylamide, acrylic acid, acrylate salts, dimethylacrylamide, dimethylacrylic acid, and dimethylacrylate salts, wherein at least 80% of particles by weight in the powder have an average particle diameter between 10 and 100 microns, wherein the brine stream comprises water with at least 90,000 ppm total dissolved solids, wherein the total dissolved solids include at least 30,000 ppm sodium cations, at least 10,000 ppm calcium cations, and at least 1,000 ppm magnesium cations, and wherein the brine stream has an electrical conductivity of greater than 50.0 mS/cm at 25° C.

2. The process of claim 1, wherein the brine stream comprises water with at least 200,000 ppm total dissolved solids, wherein the total dissolved solids include at least 70,000 ppm sodium cations, at least 40,000 ppm calcium cations, and at least 5,000 ppm magnesium cations, and wherein the brine stream has an electrical conductivity of greater than 100.0 mS/cm at 25° C.

3. The process of claim 1, wherein the friction reducing powder is treated with at least one of magnesium stearate, calcium stearate, aluminum stearate, docusate sodium, sodium bicarbonate, cellulose, tricalcium phosphate, sodium ferrocyanide, potassium ferrocyanide, sodium silicate, silicon dioxide, calcium silicate, magnesium trisilicate, talcum powder, sodium aluminosilicate, potassium aluminum silicate, calcium aluminosilicate, bentonite, aluminum silicate, stearic acid, polydimethylsiloxane, diatomaceous earth, sodium chloride, vermiculite, magnesium sulfate, or calcium sulfate.

4. The process of claim 3, wherein the brine stream comprises water with at least 200,000 ppm total dissolved solids, wherein the total dissolved solids include at least at least 70,000 ppm sodium cations, at least 40,000 ppm calcium cations, and at least 5,000 ppm magnesium cations, and wherein the brine stream has an electrical conductivity of greater than 100.0 mS/cm at 25° C.

5. The process of claim 1, wherein the friction reducing powder is first mixed with water or brine to form a slurry before injecting the slurry into the turbulent brine stream, and the slurry is injected into the brine stream less than 7 seconds after first mixing the friction reducing powder with the water or brine to form the slurry.

6. The process of claim 5, Wherein the brine and/or the brine stream comprises water with at least 200,000 ppm total dissolved solids, wherein the total dissolved solids include at least at least 70,000 ppm sodium cations, at least 40,000 ppm calcium cations, and at least 5,000 ppm magnesium cations, and wherein the brine and/or the brine stream has an electrical conductivity of greater than 100.0 mS/cm at 25° C.

7. The process of claim 1, wherein the friction reducing powder is treated with an anti-caking additive, wherein about 0.1 to 20 parts by weight of the anti-caking additive per 100 parts by weight of the friction reducing powder are present in the mixture.

8. The process of claim 7, wherein the brine stream comprises water with at least 200,000 ppm total dissolved solids, wherein the total dissolved solids include at least 70,000 ppm sodium cations, at least 40,000 ppm calcium cations, and at least 5,000 ppm magnesium cations, and wherein the brine stream has an electrical conductivity of greater than 100.0 mS/cm at 25° C.

9. The process of claim 1, Wherein the friction reducing powder comprises at least one homo-, co-, ter-, or quater-polymer having a number average molecular weight, in the range of 1,000 to 30,000,000 g/mol and is derived from at least one of the monomers acrylamide, acrylic acid, acrylate salts, dimethylacrylamide, dimethylacrylic acid, and dimethylacrylate salts, wherein 2-acrylamido-2-methylpropane sulfonic acid comprises 0.0001 to 20% of the total monomers in the polymer or acrylamido-2-methylpropane sulfonate salts comprise 0.0001 to 20% of the total monomers in the polymer.

10. The process of claim 9, wherein the 2-acrylamido-2-methylpropane sulfonic acid comprises 0.0001 to 15% of the total monomers or the 2-acrylamido-2-methylpropane sulfonate salts comprises 0.0001 to 15% of the total monomers.

11. The process of claim 9, wherein the 2-acrylamido-2-methylpropane sulfonic acid comprises 0.0001 to 10% of the total monomers or the 2-acrylamido-2-methylpropane sulfonate salts comprises 0.0001 to 10% of the total monomers.

12. The process of claim 9, wherein the 2-acrylamido-2-methylpropane sulfonic acid comprises 0.0001 to 5% of the total monomers or the 2-acrylamido-2-methylpropane sulfonate salts comprises 0.0001 to 5% of the total monomers.

13. The process of claim 1, wherein the friction reducing powder comprises at least one homo-, co-, ter-, or quater-polymer having a number average molecular weight in the range of 1,000 to 30,000,000 and is derived from at least one of the monomers acrylamide, acrylic acid, acrylate salts, dimethylacrylamide, dimethylacrylic acid, and dimethylacrylate salts, wherein 2-acrylamido-2-methylpropane sulfonic acid, comprises 0.0001 to 20% of the total monomers in the polymer or 2-acrylamido-2-methylpropane sulfonate salts comprise 0.0001 to 20% of the total monomers in the polymer, and wherein the brine stream comprises water with at least 200,000 ppm total dissolved solids, wherein the total dissolved solids include at least at least 70,000 ppm sodium cations, at least 40,000 ppm calcium cations, and at least 5,000 ppm magnesium cations, and wherein the brine stream has an electrical conductivity of greater than 100.0 mS/cm at 25° C.

14. The process of claim 13, wherein the 2-acrylamido-2-methylpropane sulfonic acid comprises 0.0001 to 15% of the total monomers or the 2-acrylamido-2-methylpropane sulfonate salts comprises 0.0001 to 15% of the total monomers.

15. The process of claim 13, wherein the 2-acrylamido-2-methylpropane sulfonic acid comprises 0.0001 to 10% of the total monomers or the 2-acrylamido-2-methylpropane sulfonate salts comprises 0.0001 to 10% of the total monomers.

16. The process of claim 13, wherein the 2-acrylamido-2-methylpropane sulfonic acid comprises 0.0001 to 5% of the total monomers or the 2-acrylamido-2-methylpropane sulfonate salts comprises 0.0001 to 5% of the total monomers.

17. The process of claim 1, further comprising: mixing the friction reducing powder with mineral oil to form a dispersion, wherein the step of injecting the friction reducing powder into the turbulent brine stream includes injecting the dispersion into the turbulent brine stream.

18. The process of claim 17, wherein the dispersion includes between 20 and 55 weight percent friction reducing powder in mineral oil.

19. The process of claim 1, further comprising: mixing the friction reducing powder with a non-hydrating fluid to form a dispersion, the non-hydraulic fluid comprising dipropylene glycol methyl ether, dipropylene glycol methyl ether acetate, dipropylene glycol butyl ether, dipropylene glycol propyl ether, propylene glycol methyl ether, propylene glycol butyl ether, propylene glycol methyl ether, tripropylene glycol butyl ether, or tripropylene glycol methyl ether, and wherein the step of injecting the friction reducing powder into the turbulent brine stream includes injecting the dispersion into the turbulent brine stream.

20. The process of claim 19, wherein the dispersion includes between 20 and 55 weight percent friction reducing powder in the non-hydrating fluid.

21. The process of claim 1, wherein the mixture is injected into the turbulent brine stream during a hydraulic fracturing operation.

22. The process of claim 1, wherein the mixture is injected into the turbulent brine stream during a coiled tubing pumping or coiled tubing drilling operation.

23. The process of claim 1, wherein the acrylamide-containing polymer comprises not more than 0.0001% 2-acrylamido-2-methylpropane sulfonic acid and not more than 0.0001% 2-acrylamido-2-methylpropane sulfonate salts based on the total monomers from which the polymer is derived.

24. The process of claim 7, wherein the acrylamide-containing polymer comprises not more than 0.0001% 2-acrylamido-2-methylpropane sulfonic acid and not more than 0.0001% 2-acrylamido-2-methylpropane sulfonate salts based on the total monomers from which the polymer is derived.

25. The process of claim 19, wherein the acrylamide-containing polymer comprises not more than 0.0001% 2-acrylamido-2-methylpropane sulfonic acid and not more than 0.0001% 2-acrylamido-2-methylpropane sulfonate salts based on the total monomers from which the polymer is derived.

* * * * *